United States Patent
Speth et al.

(10) Patent No.: US 12,552,677 B2
(45) Date of Patent: Feb. 17, 2026

(54) METHOD FOR THE CONTROL OF PRESSURE IN A LOOP FOR THE PREPARATION OF AMMONIA OR METHANOL

(71) Applicant: Topsoe A/S, Kgs. Lyngby (DK)

(72) Inventors: Christian Henrik Speth, Lynge (DK); Michael Hultqvist, Bagsværd (DK); Pat A. Han, Smørum (DK)

(73) Assignee: Topsoe A/S, Kgs. Lyngby (DK)

( * ) Notice: Subject to any disclaimer, the term of this patent is extended or adjusted under 35 U.S.C. 154(b) by 681 days.

(21) Appl. No.: 17/918,833

(22) PCT Filed: May 14, 2021

(86) PCT No.: PCT/EP2021/062829
§ 371 (c)(1),
(2) Date: Oct. 13, 2022

(87) PCT Pub. No.: WO2021/233780
PCT Pub. Date: Nov. 25, 2021

(65) Prior Publication Data
US 2023/0137755 A1    May 4, 2023

(30) Foreign Application Priority Data

May 18, 2020  (DK) .......................... PA 2020 00598
Sep. 7, 2020  (DK) .......................... PA 2020 01008

(51) Int. Cl.
*C01C 1/04*     (2006.01)
*C07C 29/151*   (2006.01)
*C25B 1/04*     (2021.01)
*C25B 1/23*     (2021.01)
*C25B 1/50*     (2021.01)

(52) U.S. Cl.
CPC .......... *C01C 1/0417* (2013.01); *C01C 1/0482* (2013.01); *C07C 29/1518* (2013.01); *C25B 1/04* (2013.01); *C25B 1/23* (2021.01); *C25B 1/50* (2021.01)

(58) Field of Classification Search
None
See application file for complete search history.

(56) References Cited

U.S. PATENT DOCUMENTS 4,305,918 A    12/1981  Gaines
10,077,235 B2   9/2018  Erlandsson et al.
(Continued)

FOREIGN PATENT DOCUMENTS

CN    1474783 A     2/2004
CN    202580624 U   12/2012
(Continued)

OTHER PUBLICATIONS

Liu Suyan et al., "Anti-surge Circuit Modification and Application of Synthetic Gas Compressor", Journal of Henan Science and Technology, No. 7, pp. 36-38, Jul. 25, 2015.
(Continued)

*Primary Examiner* — Colin W. Slifka
(74) *Attorney, Agent, or Firm* — Blank Rome LLP

(57) ABSTRACT

Method for the control of pressure in a loop for the preparation of ammonia or methanol by means of an anti-surge control valve of a compressor and/or a compressor flow regulation valve for the recirculation of loop recirculation gas at variating flow supply of fresh synthesis gas.

5 Claims, 2 Drawing Sheets

(56) References Cited

U.S. PATENT DOCUMENTS

| | | |
|---|---|---|
| 2004/0042951 A1 | 3/2004 | Lippmann et al. |
| 2015/0118592 A1 | 4/2015 | Allebrod et al. |
| 2015/0308676 A1 | 10/2015 | Lee et al. |
| 2018/0119590 A1 | 5/2018 | Hiltunen et al. |
| 2018/0135637 A1 | 5/2018 | Narayanan et al. |
| 2019/0078574 A1 | 3/2019 | Calosi et al. |
| 2020/0056290 A1 | 2/2020 | Yang et al. |

FOREIGN PATENT DOCUMENTS

| | | |
|---|---|---|
| CN | 105518263 A | 4/2016 |
| CN | 103524299 B | 8/2017 |
| CN | 107250106 A | 10/2017 |
| CN | 107382665 A | 11/2017 |
| CN | 108101743 A | 6/2018 |
| EP | 3 454 163 A1 | 3/2019 |
| EP | 3 819 261 A1 | 5/2021 |
| GB | 2464691 A | 4/2010 |
| JP | 2015-536894 A | 12/2015 |
| JP | 3220107 U | 2/2019 |
| WO | WO 2019/072608 A1 | 4/2019 |

OTHER PUBLICATIONS

Sun Xianru, "Application and Measure of GM Type Blower on Air Blowing and Smelting of Mitte", Fan Technology, No. 1, pp. 55-57, Mar. 30, 2007.

Control Valve Sourcebook—Chemical Unit Operations, Emerson Process Management, Fisher Controls International LLC, 2016.

Max Appl, "Ammonia, 2. Production Processes." Ullmann's Encyclopedia of Industrial Chemistry, vol. 3, pp. 139-225, 2012.

J. Moore et al., "Tutorial on Centrifugal Compressor Surge Control." $47^{th}$ Turbomachinery & $34^{th}$ Pump Symposia, Houston, Texas, Sep. 17-20, 2018.

Japanese Office Action dated May 28, 2025 issued in corresponding Japanese Patent Application No. 2022-570338.

Taiwan Search Report dated Jan. 23, 2025 issued in corresponding Taiwan Application No. 110115474.

– Use of recirculator antisurge valve as loop pressure control valve

– additional pressure control valve instead of using recirculator antisurge valve loop pressure control – Use of additional valve(s) as loop pressure control valve

METHOD FOR THE CONTROL OF PRESSURE IN A LOOP FOR THE PREPARATION OF AMMONIA OR METHANOL

The present invention is directed to the method for the control of pressure in a loop for the preparation of ammonia or methanol. More particular, the invention makes use of the anti-surge control valve of a compressor and/or a compressor flow regulation valve for the recirculation of an ammonia or methanol loop recirculation gas at variating flow of fresh ammonia or methanol synthesis gas.

As an example, ammonia synthesis gas is conventionally prepared by subjecting hydrocarbon feed of natural gas or higher hydrocarbons to endothermic steam reforming reactions in a fired tubular steam reformer by contact with a steam reforming catalyst. The primary reformed gas is then fed into a secondary adiabatic reformer, wherein part of hydrogen and residual amounts of hydrocarbons in the gas are partial oxidized with air or oxygen enriched air in presence of a secondary reforming catalyst. From the secondary reformer, raw synthesis gas containing hydrogen, nitrogen, carbon monoxide and carbon dioxide formed during reaction of the feedstock in the above steam reforming reactions and nitrogen introduced into the gas through addition of air in the secondary reforming step.

The primary and secondary steam reforming can in large scale ammonia or methanol synthesis plants be replaced by autothermal reforming (ATR).

Recently, use of renewable energy in the ammonia or methanol synthesis has become more available. As an example, combination of electrolysis of water operated on renewable energy, such as wind power and solar energy for the production of hydrogen by electrolysis of water and air separation for the production of nitrogen has been envisaged for the preparation of ammonia synthesis gas. The thus produced hydrogen and nitrogen are combined in stoichiometric ratios to form synthesis gas for ammonia production.

The problem when using renewable energy in the ammonia or methanol synthesis is that the supply of energy variates depending on the natural variations of for instance wind and sun. As a result, the flow of fresh methanol or ammonia synthesis gas produced by means of renewable energy can variate substantially.

Because of relatively low single pass conversion rates of ammonia or methanol synthesis gas in in the respective converters caused by equilibrium limitations, a large loop recycle stream of unconverted synthesis gas is required in the loops.

To substitute converted hydrogen and nitrogen in the unconverted synthesis gas, a make-up gas of fresh ammonia synthesis gas must constantly be added into the loop recycle gas. Similar, to the ammonia synthesis, converted hydrogen and carbon oxides must be substituted in the methanol synthesis loop with fresh hydrogen and carbon oxides containing synthesis gas.

In case of large and frequent load variations because of variating flow of fresh synthesis gas to the synthesis loop, the mechanical stress caused by pressure variations introduced by the load variations will lead to unreferenced mechanical stress conditions that may cause mechanical failures of pressure bearing equipment. The temperature variations, however, will be limited.

Such operating conditions are especially relevant when the production is dependent on a variable flow of feedstock such as it is the case for green ammonia or methanol production.

Traditionally an ammonia and methanol loop does not feature a dedicated pressure control. In case of reduced feed flow to the loop, the loop pressure will drop. Thereby the conversion will reduce to a point eventually matching the make-up flow. In case of increasing feed flow, the pressure and the conversion will increase. Since the load of a traditional ammonia and methanol plants tends to be stable over long periods, the absence of a pressure control does not normally represent a problem.

For a given ammonia converter/loop configuration a possible way to control the loop pressure is variating the H/N ratio in the in the fresh ammonia synthesis gas, i.e. the make-up gas can to decrease the reactivity of the gas. In some cases, it is also possible to vary the contents of inerts in the loop by reducing the purge flow, but this is seldom relevant for green ammonia production where the make-up gas is very low in inerts. In practice, however, it is difficult to control loop pressure with this method.

We have found that the amount of feed gas to the to the ammonia and methanol reactor can be controlled by the anti-surge control of the recirculator (loop recycle compressor). The antisurge or kickback valve is typically a fast reacting control element for protection against surge resulting in vibrations and thus damage of the compressor.

Pursuant to the above finding, the present invention provides a method for the control of pressure in a loop for the preparation of ammonia or methanol comprising the steps of (a) providing a fresh ammonia or methanol synthesis gas;
(b) providing a loop recirculation gas;
(c) providing a loop recirculation compressor with an antisurge valve and/or a compressor flow regulation valve;
(d) providing an ammonia or methanol synthesis loop;
(e) adding the fresh ammonia or methanol synthesis gas into the loop recirculation gas;
(f) pressurizing the loop recirculation gas from step (e) in the loop recirculation compressor; and
(g) monitoring pressure in the ammonia or methanol synthesis loop, wherein flow of the loop recirculation gas through the anti-surge valve and/or the recirculation compressor flow regulation valve is controlled to obtain a substantially constant pressure in the ammonia or methanol synthesis loop.

In case of slow load variation (days or weeks), the method according to the invention can be supplemented by control of the temperature in a high pressure ammonia or methanol loop separator. Thereby reactivity of the loop recirculation loop gas flowing to the ammonia converter can be reduced when the concentration of ammonia in the feed gas is increased. Higher temperature leads to less reactivity and higher loop pressure.

Thus, in an embodiment of the invention the method comprises the further step of controlling temperature in a loop separator arranged in the loop for the preparation of ammonia or methanol.

The loop separator separates liquid ammonia or methanol product from the unconverted gas effluent from the synthesis converter at equilibrium between gas and liquid at the given pressure and temperature. At constant pressure and higher temperature gives higher content of product in unconverted gas to be recycled back to the synthesis converter. This will lower the potential conversion per pass since the synthesis reaction is limited by equilibrium resulting in reduced capacity of the synthesis loop at constant pressure.

One of the advantages of the invention is that energy for operating various equipment for the preparation of ammonia synthesis gas can be renewable energy generated by windmills, solar cells, hydraulic energy or other renewables.

Preferably, the equipment comprises one or more electrolysis units, such as solid oxide electrolysis cells.

Thus, in an embodiment of the invention, hydrogen contained in the fresh ammonia or methanol synthesis gas is provided by means of electrolysis of water.

In further an embodiment, nitrogen contained in the fresh ammonia synthesis gas is provided by means of air separation.

In still an embodiment of the invention, the fresh methanol synthesis gas is provided by co-electrolysis of water and carbon dioxide.

In further an embodiment of the invention, the fresh ammonia synthesis gas is prepared in a solid oxide electrolysis cell of water and air.

DETAILED DESCRIPTION OF THE PREFERRED EMBODIMENTS

Figure 1:
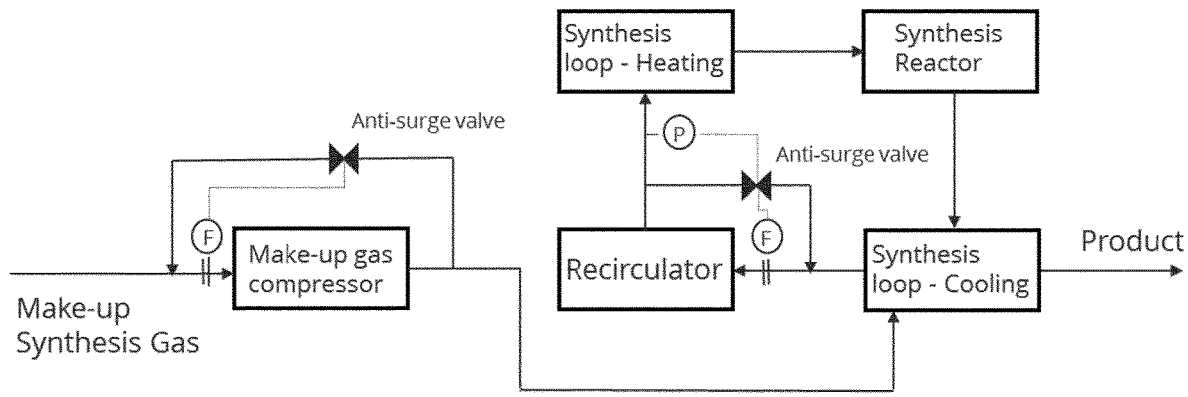
FIG. 1 shows a configuration of the make-up gas compressor, recirculator and synthesis loop.

FIG. 1 shows a typical configuration of the make-up gas compressor, recirculator and synthesis loop.

If the antisurge valve is open, then less flow will pass on to the reactor. During start-up where the synthesis reactor is heated up by circulating gas in the loop and having the start-up heater ignited then the antisurge will initially be fully open in order to protect the recirculator from surge and to reduce the flow rate to the reactor for easy control of the heating up phase.

The same valve (antisurge valve) is used simultaneously as compressor protection and flow control valve to the reactor. This is feasible as the two functions are never contradictory and in any case the machine protection will overrule all other set point to the valve. This concept is well proven for start-up of the synthesis.

Using renewable energy for production of synthesis gas will provide fluctuations throughout a day in feed gas flow rate resulting in many and possibly also abrupt synthesis pressure fluctuations. This can be smoothed out or even eliminated by the method according to the invention.

In normal operation, the recirculator antisurge valve can be used for control of the loop pressure. At full capacity the valve will remain closed and if less make up gas is available then the recirculation gas flow will be reduced correspondingly by controlled opening of the valve.

This will limit the conversion of synthesis gas in the loop to exactly the amount of make-up gas available resulting in keeping the same amount of gas in the loop and thus constant loop pressure.

There might be an understanding of the loop pressure is also controlled by the make-up compressor speed, but this is not the case as the make-up gas compressor will deliver the required pressure for a given conversion in the loop.

Since the method of the invention controls the conversion in the loop to maintain a constant loop pressure then the make-up gas compressor will follow the loop requirement. The only way the make-up gas compressor can do that and still be within its operating window (flow versus discharge pressure) is by opening its own antisurge valve(s) to compensate for the lower make-up gas flow available (see FIGS. 1 and 2).

There could be cases where it is not allowed to use the antisurge valve for loop pressure control valve. Then the alternative would be to install a control valve in parallel without jeopardizing the compressor surge protection as the antisurge valve opening is still governed by the compressor requirement measured as resulting flow from two control valves to the suction of the recirculator (see FIG. 2).

Since the conversion equilibrium temperature remains constant, a control which ensure the ratio between make-up gas and converter feed gas remains constant will nearly eliminate pressure and temperature fluctuations in the converter and ammonia loop.

Because the anti-surge valve has a security function, the flow from the compressor discharge side to suction side may additionally or completely be regulated by means of compressor flow regulation valve during feed gas flow variations.

Figure 2:
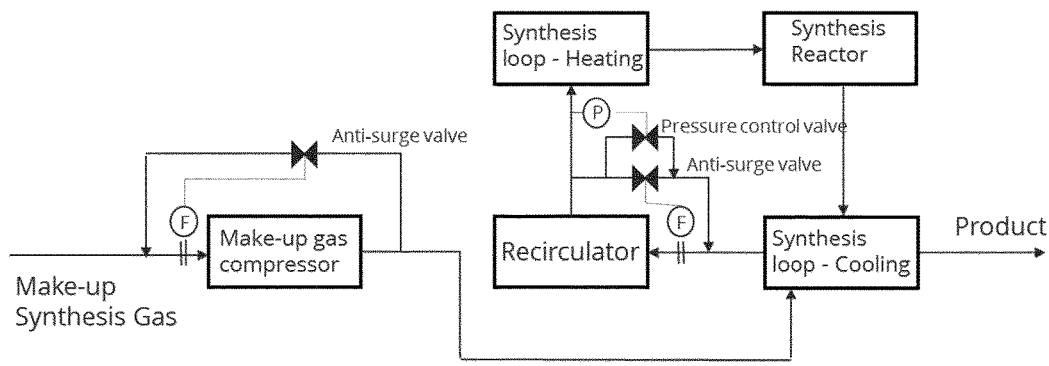
FIG. 2 shows a configuration using an additional pressure control valve instead of using recirculatory anti-surge valve loop control.

The examples of FIGS. 1 and 2, will have a limitation on the turn down of the gas flow since the minimum flow to the converter will depend on the pressure drop ratio between the converter and the anti-surge valve.

Figure 3:
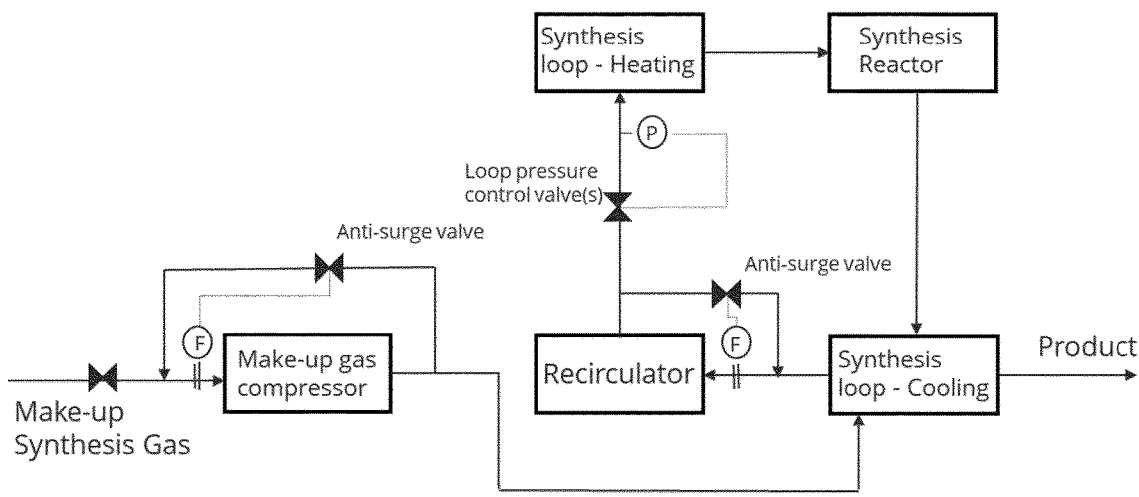
FIG. 3 shows a configuration where the gas flow to the converter is controlled down to a zero flow by a loop pressure controller and optionally a small bypass valve.

FIG. 3 shows a configuration where the gas flow to the converter can be controlled down to a zero flow by means of a loop pressure controller and optionally a small bypass valve. When reducing or closing the loop pressure controller, the synthesis gas in the synthesis reactor is retained in the reactor and maintains the reactor pressure. This will allow the loop pressure to be controlled down to very low load and still keep the loop pressure up and the converter in hot conditions. This is important in the case where suddenly the renewable energy and thus synthesis gas production comes back from low load to high load, then the conversion of synthesis gas into ammonia or methanol can take place essentially instantaneous.

Figure 4:
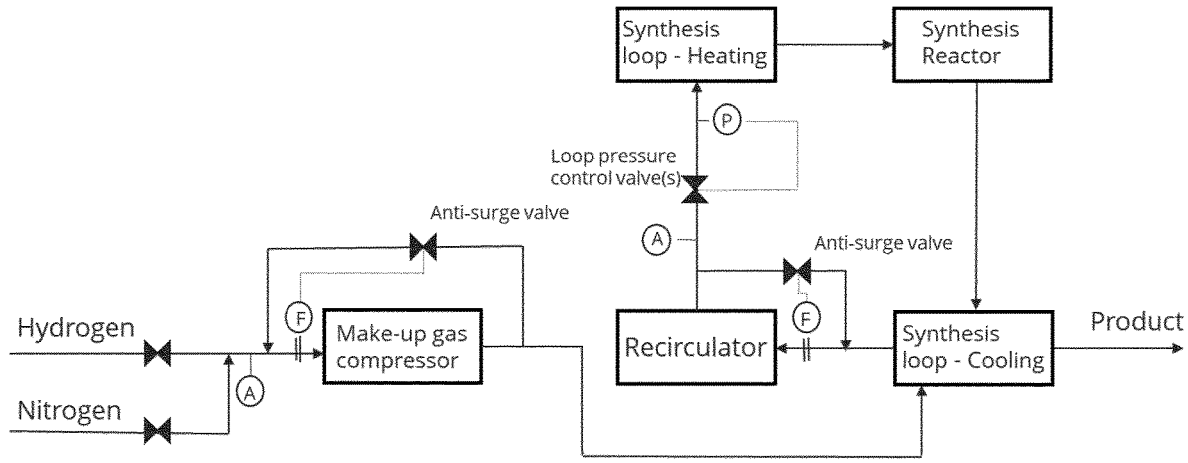
FIG. 4 shows process layout similar to FIG. 3 where one or more valves control converter inlet flow, recirculatory anti-surge flow, and make-up gas compressor flow.

FIG. 4 shows a similar process layout as shown in FIG. 3, where one or more valves are foreseen to control converter inlet flow, recirculator anti-surge flow, and make-up gas compressor anti-surge flow. The module of the make-up gas is controlled by a ratio controller of hydrogen and nitrogen flow in ammonia synthesis gas by controlling the nitrogen flow rate relative to the hydrogen flow rate. With many fluctuations perhaps daily in energy supply, and thus directly impacting the hydrogen flow rate and also the nitrogen flow rate, the measurement of hydrogen and nitrogen flow might get a bit off set at each fluctuation. A small change in the make-up gas module will be amplified in the module of the loop recirculation gas and for this reason it is desirable to improve the module controller by having a near real-time analyzer on the make-up gas. Typically, a common gas chromatography analyzer is used for multiple sampling point leading to long tubing from each sampling point to the analyzer, which results in long cycle time for each analysis. Long cycle time of 10-20 min. is not suitable for adjustment of the module controller. A real-time analyzer can provide a cycle time of 10-20 sec. and the module controller can act in time before a wrong module gets amplified in the loop resulting in loss of capacity and/or pressure increase when high capacity is required.

In the figures, A defines an analysis point, F a flow measurement point, and P a pressure measurement point.

The invention claimed is:

1. A system for controlling pressure in a loop for the synthesis of ammonia or methanol, comprising:
    a make-up gas compressor configured to pressurize a make-up synthesis gas,
    a synthesis loop configured to receive a pressurized make-up synthesis gas from the make-up gas compressor, the synthesis loop comprising a synthesis reactor, a synthesis loop cooler, a loop recirculation compressor, a synthesis loop heater, and a pressure monitor;
    the synthesis reactor arranged to receive a heated loop recirculation gas from the synthesis loop heater and configured to provide an at least partially synthesized gas to the synthesis loop cooler;
    the synthesis loop cooler configured to cool the at least partially synthesized gas and separate into a product stream and a loop recirculation gas;
    the loop recirculation compressor arranged to receive the loop recirculation gas and configured to pressurize and provide a pressurized loop recirculation gas to the synthesis loop heater;
    wherein the loop recirculation compressor comprises an anti-surge valve and/or a compressor flow regulation valve in communication with the pressure monitor, the anti-surge valve and/or a compressor flow regulation valve being configured to control the flow of the loop recirculation gas through the anti-surge valve and/or a compressor flow regulation valve to obtain a substantially constant pressure in the ammonia or methanol synthesis loop.

2. The system according to claim 1, wherein the compressor flow regulation valve is arranged in parallel with the anti-surge valve.

3. The system according to claim 1, further comprising a second anti-surge valve configured to control the flow of ammonia or methanol make-up synthesis gas provided by the make-up gas compressor to the synthesis loop.

4. The system according to claim 1, further comprising a high pressure loop separator arranged in the loop for the preparation of ammonia or methanol, for controlling temperature.

5. The system according to claim 1, further comprising a loop pressure controller downstream or upstream of the recirculation compressor for additionally controlling the loop recirculation gas.

* * * * *